United States Patent [19]
Tindal

[11] 3,782,690
[45] Jan. 1, 1974

[54] APPARATUS FOR THREADING A TENDON THROUGH A SHEATH

[75] Inventor: Ian Tindal, San Francisco, Calif.

[73] Assignee: Bechtel International Corporation, San Francisco, Calif.

[22] Filed: Dec. 8, 1971

[21] Appl. No.: 206,027

Related U.S. Application Data

[62] Division of Ser. No. 11,100, Feb. 13, 1970, Pat. No. 3,719,982.

[52] U.S. Cl. ............................................. 254/105
[51] Int. Cl. ............................................. B66f 1/00
[58] Field of Search ............................ 29/252, 241; 254/105, 29.5 A; 269/272, 273

[56] References Cited
UNITED STATES PATENTS

| | | | |
|---|---|---|---|
| 95,258 | 9/1869 | Parker | 269/272 |
| 252,632 | 1/1882 | Tatro | 269/272 X |
| 330,536 | 11/1885 | Wing | 269/272 |
| 545,324 | 8/1895 | Wakefield | 269/273 X |
| 758,838 | 5/1904 | Hermann | 269/273 X |
| 2,114,531 | 4/1938 | Harvey | 269/272 X |
| 3,257,099 | 6/1966 | Merritt | 254/105 |
| 3,437,316 | 4/1969 | Hart | 254/29 A X |

*Primary Examiner*—Charlie T. Moon
*Attorney*—Eckhoff et al.

[57] ABSTRACT

A novel jacking system and method are provided for moving a cable through a sheath which includes opposite vertical portions connected by an intermediate arcuate portion. The cable is relatively heavy, being made up of the order of some 170 to 200 strands of high carbon steel wire, each approximately of the order of one-quarter inch in diameter. The total length of the cable is of the order of 500 feet while its weight is some 7-1/2 to 10 tons.

3 Claims, 7 Drawing Figures

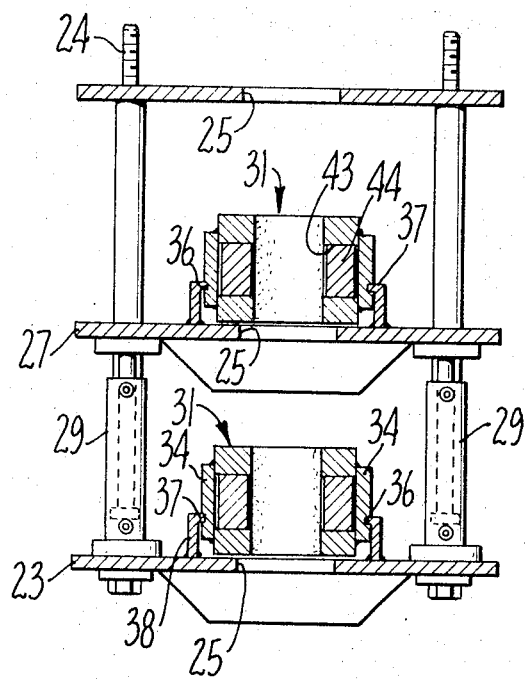
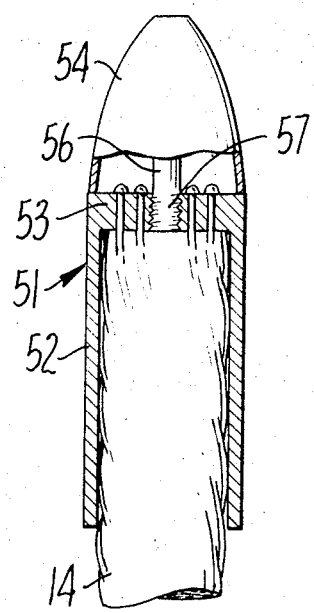
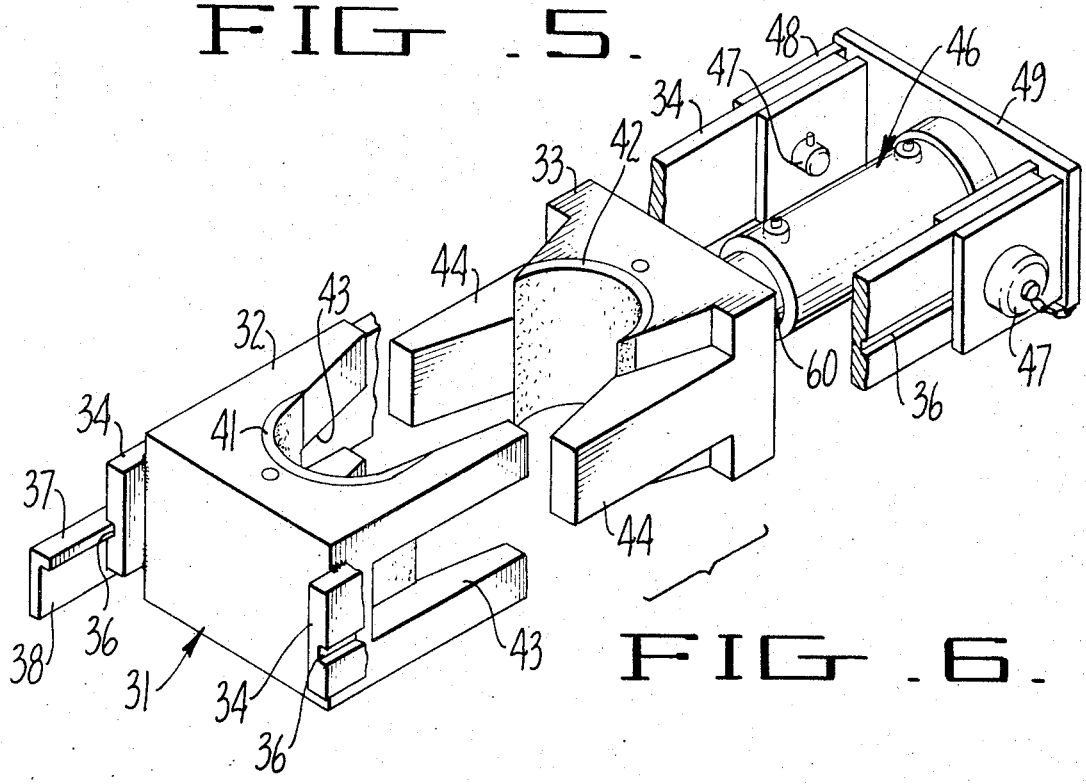
FIG. 5.
FIG. 7.
FIG. 6.

APPARATUS FOR THREADING A TENDON THROUGH A SHEATH

This is a division of application Ser. No. 11,100 filed Feb. 13, 1970, now U.S. Pat. No. 3,719,982.

BACKGROUND OF THE INVENTION

The containment of a nuclear reactor in a suitable housing structure provides a problem for the building must be quite large. In addition, it is desirable that the building be quite rugged in construction so that, in the event of any untoward incident, adequate containment would be provided. In the past, such buildings have been constructed by providing a base in which reinforcing wires were placed horizontally about the base while the top of the building included an enlarged section through which the reinforcing wires were run angularly.

It has been proposed that such a building could be made in the form of a semi-circular dome structure in which the radius of curvature would be of the order of 60 feet or more and the overall height of the dome structure would be some 200 feet. Until the present invention was achieved, it was not possible to provide the suitable cable reinforcing that was necessary. The only known practice prior to the present invention was to pull the cables into place. With cables of the size necessary for reinforcement, the friction load upon pulling such a cable through the sheaths would be of such great magnitude that such a structure was considered impossible of attainment.

In accordance with the present invention, I provide a method and apparatus for pushing rather than pulling each cable through the sheath. In this manner, it is possible to move the cable through the sheath without any great frictional load either upon the supporting structure or the sheath through which the cable is moved. When the cable has completed its journey through the sheath, the advancing end is drawn out past the end of the sheath and a suitable securing means is fastened to the end of the cable. The cable is then forced back into the sheath and its other end is engaged and a suitable tension is placed upon the cable. The tensioning operation, however, forms no part of the present invention.

SUMMARY OF THE INVENTION

It is in general a broad object of the present invention to provided a novel jacking method and system for moving a heavy cable through a suitable sheath and, once the cable is positioned, for placing the cable under stress within the sheath.

The invention includes other objects and features of advantage, some of which, together with the foregoing, will appear hereinafter wherein the present preferred form of the method and the mechanism is disclosed.

BRIEF DESCRIPTION OF THE DRAWINGS

FIG. 5 is a section taken at 90° through the jacking mechanism shown in FIG. 4.

FIG. 6 is a perspective view showing the clamping jaws utilized for engaging and holding the cable.

FIG. 7 is a fragmentary view of an encapsulated cable end.

DESCRIPTION OF THE PREFERRED EMBODIMENT

Figures 1, 2:
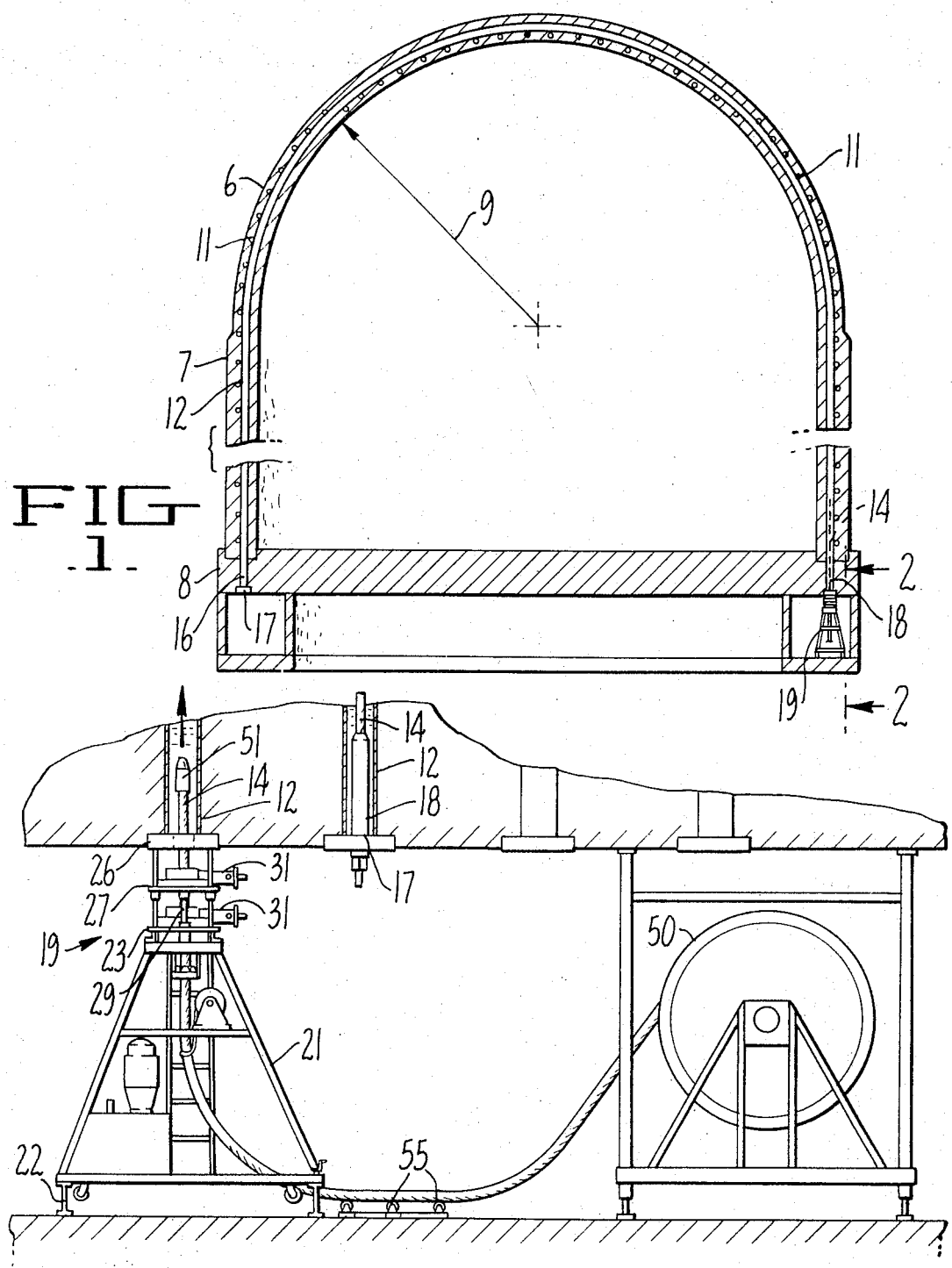
FIG. 1 is a side elevation of a dome showing a cable in position in a sheath.
FIG. 2 is a view taken along the line 2—2 in FIG. 1 showing the jacking mechanism in side elevation.

Referring to the drawings and particularly to FIG. 1, there is shown a semi-spherical dome 0 having a lower annular portion 7 supporting the dome proper upon a suitable base 8. As has been set forth previously, the radius of curvature of the dome, as indicated by line 9 in FIG. 1, is of the order of 60 feet. The dome proper is formed of concrete and suitable steel reinforcing, generally indicated at 11, is provided about the dome.

Also positioned in the dome and in the annular portion is a plurality of tubular sheaths 12 each extending from the base about the dome from one side of the base to the other. Positioned in each of the sheaths is a cable 14. As mentioned previously, when positioned, end 16 of the cable 14 is secured by a suitable plug member 17 at the end of the sheath.

Figure 3:
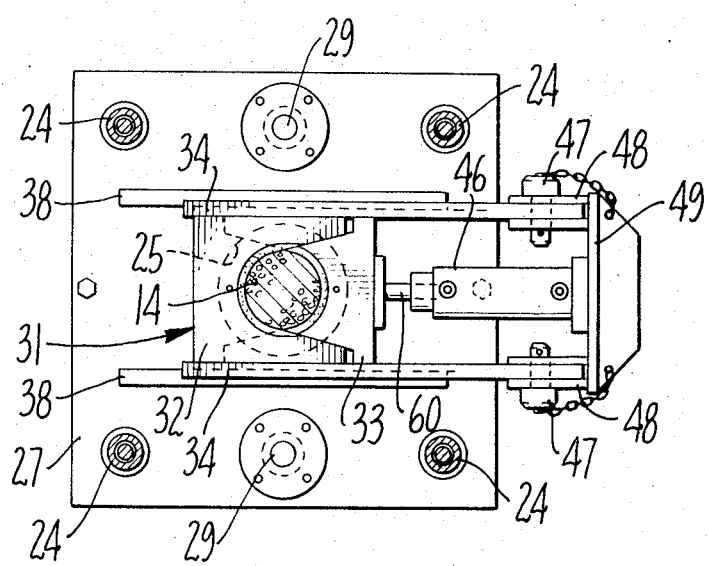
FIG. 3 is a sectional view taken through the jacking apparatus.
Figure 4:
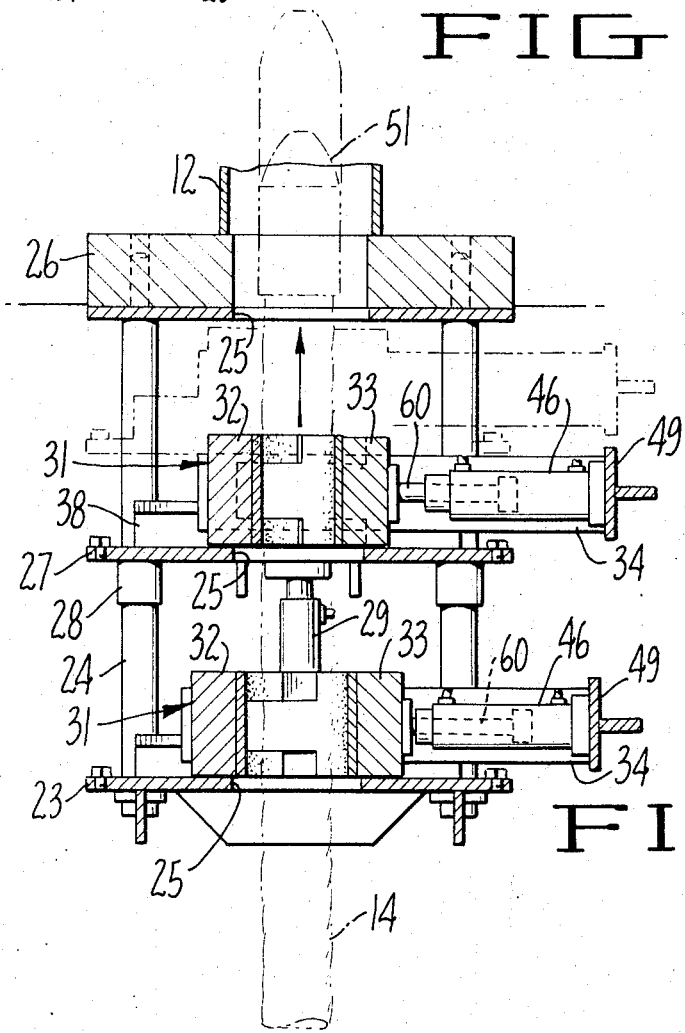
FIG. 4 is a side elevation of the jacking apparatus showing it in position for moving the cable, the cable being shown in dotted lines.

In FIG. 1 the other end 18 of the cable 14 is shown as attached to the jacking mechanism, generally indicated at 19. The jacking mechanism includes a suitable frame support 21 supported upon a base 22. On the upper portion of the frame 21 is mounted a base plate or lower platform 23, the latter being connected by mounting bolts 24 to a top support 26. Intermediate the base or lower platform 23 and the top support 26 an upper platform 27 is mounted, the latter being movable by bearings 28 along the support bolts 24. An aperture 25 is provided in each of the base or lower platform, upper platform and top support for passage of the cable. The platform is movable toward and away from the top support by means of jacking means or hydraulic raising and lowering jacks, generally indicated at 29. The jacks are provided upon opposite sides of the base or lower platofrm and the platform 27 as appears in FIG. 3.

Mounted upon the platform 27 and the base 23 are clamps, generally indicated at 31 and shown in perspective view in FIG. 6. The clamps are alike and a description of one will suffice for a description of the other. Each clamp is made up of two diametrically opposed jaws 32 and 33. Jaw 32 includes a pair of side members 34 having grooves 36 therein fitting on flanges 37 on rails 38 which are secured respectively to the platform 27 and to the base 23. Each of the clamp jaws 32 and 33 includes semi-cylindrical inserts 41 and 42, these being preferably made of a relatively soft metal such as aluminum for gripping the cable. Clamp jaw 32 has grooves 43 therein to receive the opposite projecting arms 44 on clamp jaw 33.

To open and close the jaws, a cylinder and piston structure, generally indicated at 46, is provided. Each cylinder and piston is mounted across the end of members 34 by pins 47 which extends through opposite plates 48. A base 49 on the cylinder of the cylinder-piston structure extends between the plates and supports. Piston 60 in the piston cylinder structure 46 engages the clamp member 33.

To position a cable in the sheath, the cable is fed from the supply roll 50 over guide rollers 55 and is threaded through the clamps. A spud, generally indicated at 51, is mounted on the end of the cable to facilitate its passage through the sheath. The spud 51 includes a casing 52 fitting snugly over the end of the cable. Several strands of the cable pass through the base 53 of the casing and are buttonheaded to hold the casing in place. A nose-piece 54 having a tube 56 secured centrally thereof is then secured to the base 53, threads 57 on the tube engaging a threaded recess in the base. The interior of the tube is also threaded for reasons which will appear.

With the spud on the end of the cable positioned initially in the enlarged end of the sheath, platform 27 is lowered and the clamp on the platform is engaged with the cable. The platform is then raised through its maximum travel. The clamp on base 23 is then engaged with the cable, the clamp on the platform is released whereupon the platform is returned to its lower position. As the cable is advanced, a suitable lubricant is applied to protect the cable against corrosion and to facilitate its passage through the sheath. The jacking operation is repeated until the advancing end has reached the opposite end of the sheath whereupon a threaded rod is engaged with the internal thread in tube 56. The end of the cable is then drawn out of the sheath for several feet and the retaining attachment 17 is then placed on the end of the cable and the cable is then returned into the sheath. The cable is then tensioned and a retainer is placed on the other end of the cable to retain the cable in tension in the sheath.

From the foregoing, I believe it will be apparent that I have provided a novel method and apparatus for threading a cable in a sheath and of placing the cable under suitable tension once it is in position. All this is achieved by pushing the cable through the sheath rather than by pulling the cable by means of a previously positioned rod or cable.

I claim:

1. A jacking device for lifting and feeding a flexible cable through a sheath including vertical portions and having opposite open ends, comprising, a base supported in vertically spaced relationship below the sheath and in axial alignment with one open end thereof, a frame means supported on the base, a lower platform fixedly secured on the frame means, a pair of diametrically opposed, arcuate, horizontally aligned clamping jaws movably supported on the lower platform and having opposed, facing arcuate surfaces, an upper platform movably supported on the frame means in vertically spaced relationship above the lower platform, a pair of diametrically opposed, arcuate, horizontally aligned clamping jaws movably supported on the upper platform and in vertical alignment with the jaws on the lower platform and having opposed, facing arcuate surfaces, means connected with the respective pairs of opposed clamping jaws on the upper and lower platforms to move the jaws of each pair toward and away from one another to alternately clamp and release a cable positioned therebetween, jacking means connected with the upper platform to selectively raise and lower the upper platform and the jaws supported thereon and to thus raise a cable clamped between the jaws, said jaws being selectively and alternately operable so that a cable is first clamped by the jaws on the upper platform and then raised with the upper platform to feed the cable through a sheath and then the cable is clamped by the jaws on the lower platform to hold the cable while the upper platform and jaws are repositioned for a subsequent lifting operation, guide means on the frame means engageable with a flexible cable fed from a location offset from a vertical line drawn through the pairs of jaws to properly align the cable with the jaws for clamping of the cable, and a top support on the frame means spaced above the upper platform and engageable at the open end of the sheath to align the frame means with the sheath.

2. A jacking device as in claim 1, wherein a soft metal insert of aluminum or the like is secured to the opposed facing arcuate surfaces of the clamping jaws for gripping the cable.

3. A jacking device as in claim 2, wherein said clamping jaws are operatively connected to a piston and cylinder arrangement for actuation of the jaws, one of the jaws of each pair connected to a respective cylinder and the other jaw of each pair connected to the piston of said cylinder, one clamping jaw of each pair having a pair of spaced apart, parallel, elongate arms projecting therefrom and in sliding engagement with recess means in the other jaw of each pair.

* * * * *